US007058953B2

(12) United States Patent
Willard et al.

(10) Patent No.: US 7,058,953 B2
(45) Date of Patent: Jun. 6, 2006

(54) MANAGING A DISTRIBUTED COMPUTING SYSTEM

(75) Inventors: Michael Joseph Willard, Snoqualmie, WA (US); Mitica Manu, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 700 days.

(21) Appl. No.: 10/202,057

(22) Filed: Jul. 23, 2002

(65) Prior Publication Data
US 2004/0019894 A1    Jan. 29, 2004

(51) Int. Cl.
G06F 9/46 (2006.01)
(52) U.S. Cl. .................... 718/105; 709/224
(58) Field of Classification Search ............ 709/224; 718/105
See application file for complete search history.

(56) References Cited

U.S. PATENT DOCUMENTS

| | | | |
|---|---|---|---|
| 4,827,508 A | 5/1989 | Shear | 380/4 |
| 4,977,594 A | 12/1990 | Shear | 380/4 |
| 5,050,213 A | 9/1991 | Shear | 380/25 |
| 5,410,598 A | 4/1995 | Shear | 380/4 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,715,403 A | 2/1998 | Stefik | 705/44 |
| 5,781,703 A * | 7/1998 | Desai et al. | 706/50 |
| 6,112,181 A | 8/2000 | Shear et al. | 705/1 |
| 6,505,246 B1 * | 1/2003 | Land et al. | 709/224 |

FOREIGN PATENT DOCUMENTS

| | | |
|---|---|---|
| WO | WO 00/58811 | 10/2000 |
| WO | WO 00/59150 | 10/2000 |
| WO | WO 01/52021 A1 | 7/2001 |

OTHER PUBLICATIONS

Bauer, M.A. et al., "An integrated distributed systems management architecture", *Proceedings of CASCON '93*, 2 vol. xxx+1180 pp, Oct. 24-28, 1993.

Chadha, R. et al., "Managing Distributed Systems Using OSI Systems Management", *Proceedings of the IEEE Second International Workshop on Systems Management (Cat No. 96TB100032), IEEE Comput. Soc. Press*, 1996, 117-126.

(Continued)

Primary Examiner—Meng-Al T. An
Assistant Examiner—Camquy Truong
(74) Attorney, Agent, or Firm—Woodcock Washburn LLP

(57) ABSTRACT

A system manager tests, administers and monitors, and/or diagnoses problems with a distributed system having a plurality of computing machines. Each machine includes an event monitoring agent and the system manager comprises a data collection module (DCM), a data management module (DMM), a data storing module (DSM), and a user interface module (UIM). The DCM receives a request from the DMM describing performance data to be collected from each agent, and based on the request the DCM then collects such performance data from each agent and sends same to the DMM. The DMM stores the performance data at the DSM along with metadata corresponding to the request for current and future usage, including monitoring, analyzing and evaluation. The UIM receives requests from a user and forwards same to the DMM, and formats data from the DSM and represents the formatted data to the user.

21 Claims, 5 Drawing Sheets

OTHER PUBLICATIONS

Gonzalez, P. et al., "Managing distributed resources in the SVG project", *Proceedings 10th Euromicro Workshop on Parallel, Distributed and Network-based Processing*, 2002, 139-146.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

P. Klen, et al., "Managing Distributed Business Processes in the Virtual Enterprise", *Journal of Intelligent Manufacturing*, 2001, 12(2), 185-197.

Stefik, M., "Trusted Systems- Devices that Enforce Machine-readable Rights to use the Work of a Musician or Author may create Secure Ways to Publish over the Internet", *Scientific American*, Mar. 1997, 78-81.

Stefik, M. "Shifting the Possible: How Trusted Systems and Digital Property Rights Challenge Us to Rethink Digital Publishing", *Technical Perspective, Berkeley Technology Law Journal*, 1997, 12, 137-152.

* cited by examiner

MANAGING A DISTRIBUTED COMPUTING SYSTEM

TECHNICAL FIELD

The present invention relates to a system for managing a distributed computing process such as may be spread over a group of machines. More particularly, the present invention relates to such a system for use in testing and monitoring and administrating the group of machines, and also in diagnosing problems that arise during operation of the group of machines.

BACKGROUND OF THE INVENTION

One challenge facing an information technology manager is managing an enterprise system, application, and/or network, especially when same becomes larger and more complex. In particular, it is to be appreciated that more of such enterprise systems, applications, and/or networks are shifting from a client-server model to a distributed network computing architecture. That is, more computing systems are arranged to operate on multiple computing machines networked together, where the machines need not necessarily be in the same location and in fact may be distributed remotely from each other. Such distributed computing systems have promised to make servers work together seamlessly as a unit, yielding better fault-tolerance and easier, less-expensive scalability than can be achieved with a physically centralized computing environment.

However, and significantly, managing such a distributed computing system is a challenge, especially if the system includes machines having diverse environments, including varying operating systems, devices, protocols, and client technologies. In such a situation, troubleshooting and repairing malfunctioning hardware and software component problems may be difficult, especially when a problem relates to the interaction between multiple computing machines and/or processes. In short, collecting event data and the like from multiple computing machines and organizing the collected data in a coherent manner has not heretofore been done.

Accordingly, a need exists for a system manager to simplify and facilitate network management of a distributed computing system including a group of computing machines. More particularly, a need exists for such a system manager that facilitates testing and monitoring and administering of such a computing system, and that also diagnoses problems that arise during operation of such a computing system, all by collecting, collating, and analyzing relevant performance data from machines in the system.

SUMMARY OF THE INVENTION

The aforementioned need is satisfied by the present invention in which a system manager is provided for testing, administering and monitoring, and/or diagnosing problems with a distributed system having a plurality of computing machines. Each machine includes an event monitoring agent for monitoring for one or more pre-defined events occurring on the machine and/or for collecting usage statistics with respect to the machine, and the system manager comprises a data collection module (DCM), a data management module (DMM), a data storing module (DSM), and a user interface module (UIM).

The DCM receives a request from the DMM describing performance data to be collected from each of one or more of the machines of the system by way of the agent thereof. Based on the request, the DCM then collects such performance data from each agent and sends same to the DMM.

The DMM receives the sent performance data from the DCM and stores the received performance data at the DSM along with metadata corresponding to the request for current and future usage, including monitoring, analyzing and evaluation. The UIM receives requests from a user and forwards same to the DMM, and formats data from the DSM and represents the formatted data to the user.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
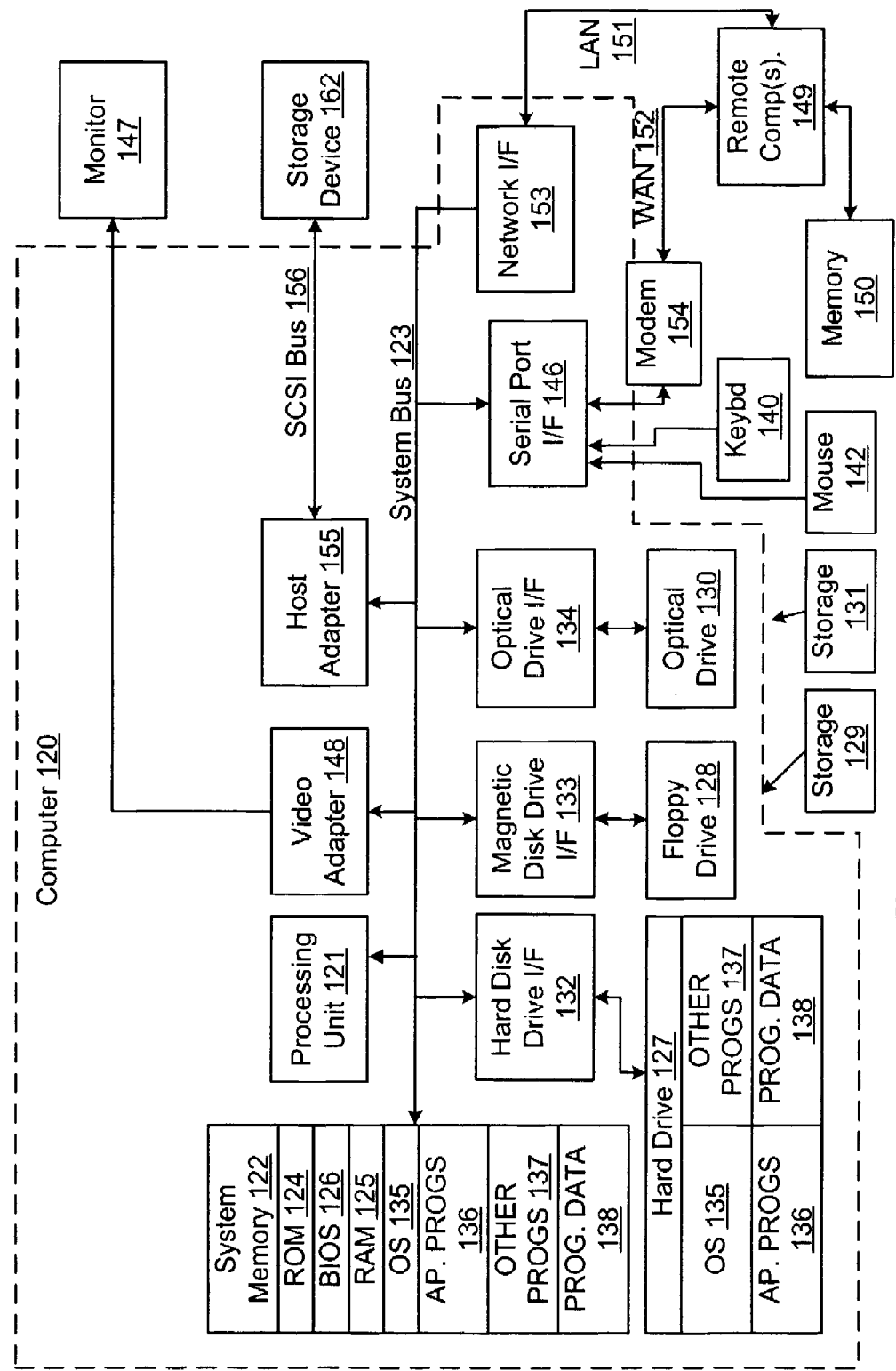
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network.

In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Computing Network Environment

Figure 2:
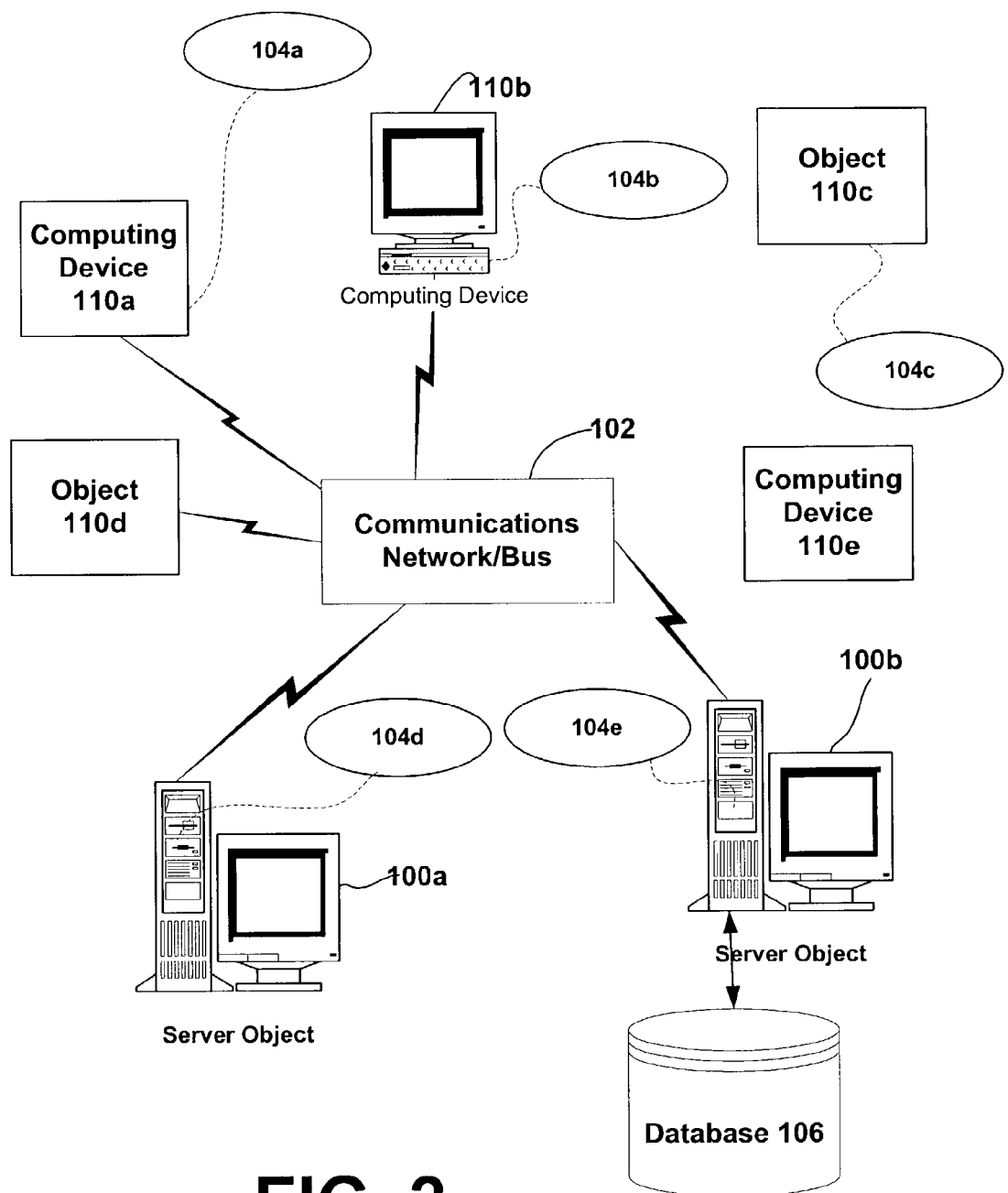
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 100a, 100b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, servers, etc. Each object can communicate with another object by way of a communications network 102. This network may itself comprise other computing objects and computing devices that provide services to the system of FIG. 2. In accordance with an aspect of the invention, each object 100 or 110 may contain an application that might request the authentication techniques of the present invention for trusted graphics pipeline(s).

It can also be appreciated that an object, such as 110c, may be hosted on another computing device 100 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 100a, 100b, etc. can be thought of as the server where server 100a, 100b, etc. maintains the data that is then replicated in the client computers 110a, 110b, etc.

A server is typically a remote computer system accessible over a remote network such as a WAN, LAN, and/or the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 100a, 100b, etc., are interconnected via a communications network/bus 102, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 102 is the Internet, for example, the servers 100 can be Web servers with which the clients 110a, 110b, 110c, 110d, 110e, etc. communicate via any of a number of known protocols such as HTTP. Servers 100 may also serve as clients 110, as may be characteristic of a distributed computing environment. Communications may be wired or wireless, where appropriate. Client devices 110 may or may not communicate via communications network/bus 102, and may have independent communications associated therewith. For example, in the case of a TV or VCR, there may or may not be a networked aspect to the control thereof. Each client computer 110 and server computer 10 may be equipped with various application program modules or objects 104 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 102 and server computers 100a, 100b, etc. that may interact with client computers 110a, 110b, etc. and other devices and databases 106.

System of the Present Invention

Figure 3:
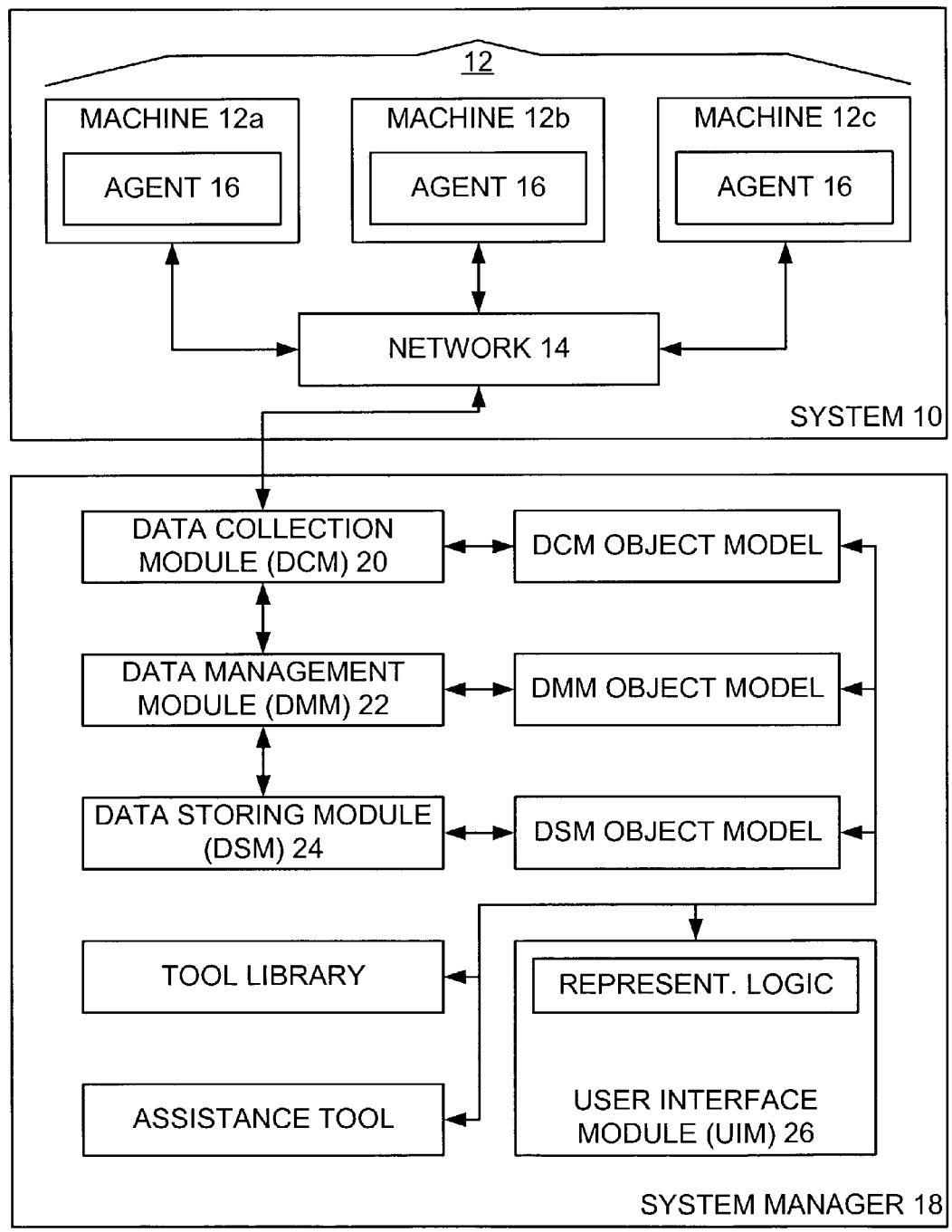
FIG. 3 is a block diagram showing a system having multiple machines and a system manager for testing, administering and monitoring, and diagnosing problems with the system in accordance with one embodiment of the present invention.

Referring now to FIG. 3, it is seen that the present invention is for testing, administering and monitoring, and diagnosing problems with a distributed system 10 having a plurality of computing machines 12. As shown, the system 10 includes three machines 12 (12a, 12b, 12c) connected by a network 14, although it is to be appreciated that the system 10 shown in FIG. 3 is merely exemplary. Thus, the system 10 may in actuality have any number of machines 12 and the machines 12 may be interconnected by any appropriate network 14 or networks 14 without departing from the spirit and scope of the present invention. Moreover, each machine 12 may be any type of machine 12, such as a server, a database, a controller, etc., also without departing from the spirit and scope of the present invention.

Significantly, each machine 12 in the system 10 includes at least one event monitoring agent 16 that monitors for one or more pre-defined events occurring on the machine 12, and/or that also can be set to collect a variety of usage statistics with respect to the machine 12. For example, the agent 16 may instantiate a performance counter that automatically notes in an event log when certain faults occur on the machine 12. Likewise, the agent 16 may also instantiate a performance counter that is configured to collect memory usage data with respect to the machine 12 periodically, perhaps every 5 seconds or so. Each machine 12 may have a single agent 16 monitoring all monitored items by way of respective performance counters, or multiple agents 16, each monitoring one or more monitored items by way of respective performance counters.

Such an agent 16 is known or should be apparent to the relevant public, and therefore need not be described herein in any detail. Generally, any appropriate agent 16 may be employed without departing from the spirit and scope of the present invention, as long as the agent 16 is suitable for the purpose intended. For example, if the machine 12 includes a WINDOWS operating system such as may be distributed by MICROSOFT Corporation of Redmond, Wash., the agent 16 may be a WINDOWS Management Instrumentation (WMI) provider such as that which is included with or available for most later WINDOWS operating systems.

As is known, a WMI provider extracts management information from an underlying data source using available interfaces, and maps the information into object classes that can be presented to a user by way of an object manager. Upon a user requesting management information, the object manager evaluates the request, identifies which provider has the information, obtains the information, and returns same to the user. The user can ask for the information without needing to know the exact source thereof or any details of how the information was extracted. Thus, each WMI provider supplies dynamic information about the managed machine 12.

Notably, each WMI provider can supply several types of information with regard to a machine 12 in the system 10, including:
  Properties: Descriptive or operational information about a particular instance of a class;
  Methods: For a given instance of a class, actions that can be executed upon that instance;
  Events: Notifications a user can request to receive for occurrences or failures of interest with regard to the machine 12—any change to a defined property can be used as the basis of an event; and
  Associations: a relationship between classes.

The WMI provider is particularly useful as an agent 16 inasmuch as such WMI provider supports key functions including:
  Remote Administration: Objects managed by a WMI provider are available to applications and scripts both locally and remotely. No additional work is needed to manage remote objects. Connecting to a remote object is similar with accessing a remote database server using a connection string;
  Query Capability: managed information as collected by a WMI provider is much like a relational database and allows for SQL-type queries to be submitted in order to filter and focus requests for data; and
  Powerful Event Publication and Subscription: Events can be requested for virtually any change with regard to the machine 12—a user can request notification of very specific events based on particular interests, and a user-defined action may be taken upon the receipt of a given event.

In one embodiment of the present invention, and referring still to FIG. 3, information as obtained from each agent 16 in the system 10 is collected and collated by a system manager 18 for purposes of testing the system 10, monitoring and administering the system 10, and diagnosing problems as they arise in connection with the system 10, and the like. To effectively perform any of such functions, the system manager 18 monitors and records operational statistics with regard to the system 10, and has desirable features including:
  Monitoring: A user should be able to select a wide variety of performance counters (i.e., particular types of performance information of interest) to be monitored—monitoring the right counters often diagnoses problems without further work on the part of the user;
  Analyzing: A user should be able to compare test results from different test runs that perhaps used different hardware/software configurations—when testing distributed applications, many scalability and performance issues can be tracked in this manner; and
  Evaluating: inasmuch as the amount of data resulting from a test can be especially large, data analysis and problem detection should be provided to the user.

In one embodiment of the present invention, the system manager 18 collects and employs performance data and metadata. Performance data is the raw data as received from each agent 16 in the system 10, is usually constituted in a relatively primitive data type (integer, floating decimal, string, etc.) and contains the raw value of a specific performance counter. Metadata represents a description relating to the circumstances of the collection of the performance data. Metadata can include data description information and data environment information. As will be appreciated, the performance data and the metadata are different but strongly interdependent.

Data description information is a description of a corresponding stream of performance data, including a data type and basic information relative to the agent 16 that generated the performance data. Data environment information is a description of the conditions in which corresponding performance data was collected, including data on the system 10, the machine 12, a global system state, the state of a different agent 16 or machine 12 that interacts with the agent 15 that generated the performance data, and the like. As may be appreciated, such data description information and data environment information are especially useful to a user comparing performance data across different test runs or as between different machines 12, for example, and at any rate provide a quick and easy reference to the performance data.

Significantly, in one embodiment of the present invention, the metadata can also represent data methods to be performed in response to the performance data. In particular, such data methods can include pre-defined actions or rules to be executed in response to conditions detected from the performance data. Such rules are user-definable and/or obtainable from a library of rules, and can be relatively simple or relatively complex. In short, a rule can be written in any appropriate syntax and represent the performance of any appropriate action in response to the detection of any appropriate condition as detected from the performance data. For example, in response to a determined condition that a machine 12 is operating at a processor capacity greater than 90 percent, the action to be taken may be to shut down or re-boot the machine 12 or to shut down or re-boot a particular process on the machine 12.

Still referring to FIG. 3, it is seen that the system manager 18 includes a data collection module (DCM) 20, a data management module (DMM) 22, a data storing module (DSM) 24, and a user interface module (UIM) 26. Note there maybe multiple ones of each of the modules 20–26, and that all of the modules 20–26 may be resident on a single computing machine, some modules 20–26 may be resident on a separate computing machine or each module 20–26 may be resident on a separate computing machine. In the case of separate machines, such machines may be local to or remote from each other networked to each other by an appropriate communications network.

Figure 4:
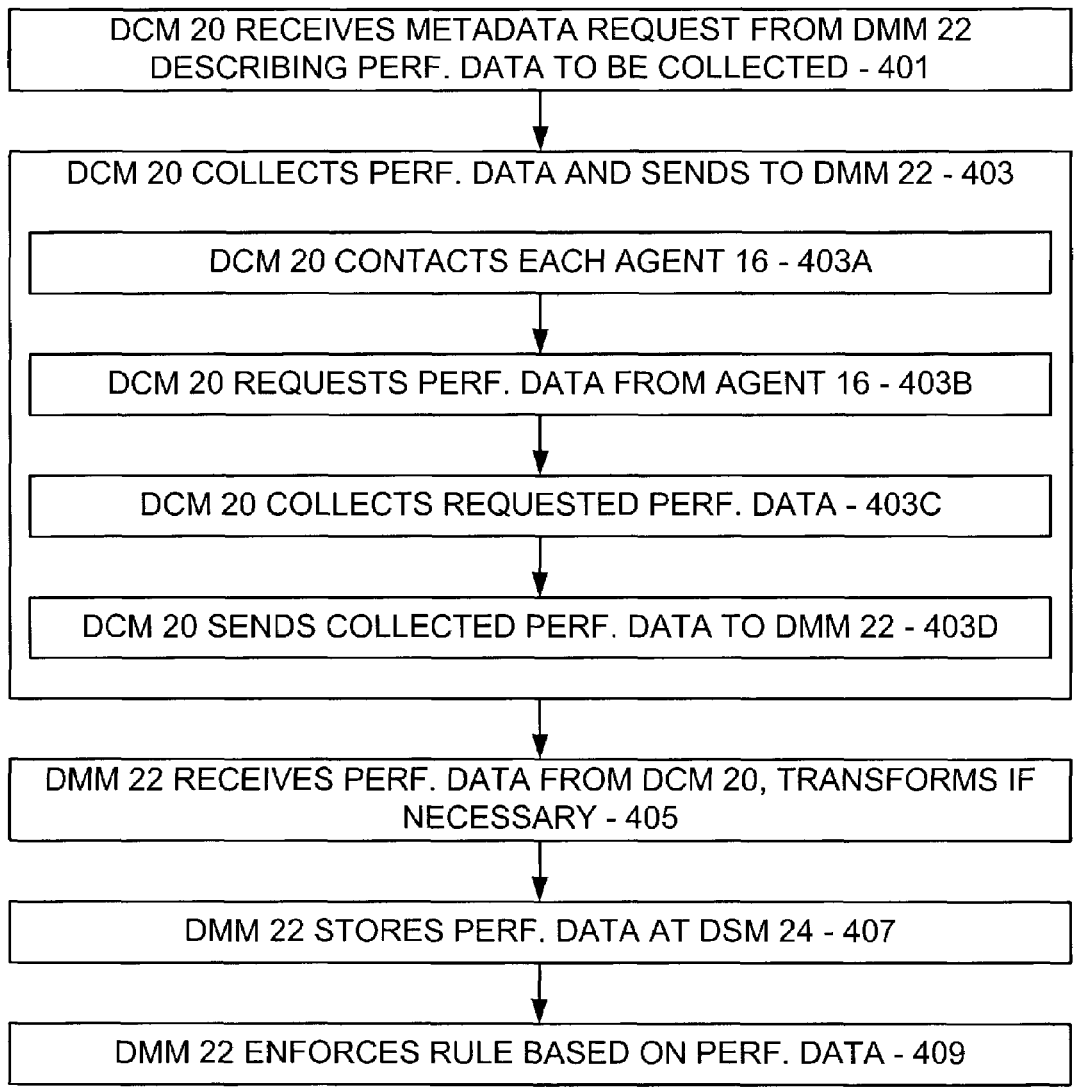
FIG. 4 is a flow diagram showing steps performed by with the system manager of FIG. 3 in accordance with one embodiment of the present invention.

With reference to FIG. 4, it is seen that the DCM 20 receives a metadata request from the DMM 22 describing performance data to be collected (step 401), and based thereon is responsible for in fact collecting such performance data and sending same to the DMM 22 (step 403). As should now be appreciated, the performance data is collected from relevant ones of the agents 16 on the machines 12 in the system 10 as specified in the metadata request. For example, if the DMM 22 is interested in collecting performance data relating to processor usage from a machine named 'EftDev01' having four processors, the metadata request may be:

```
<MetaData>
    <WMIProviderLocation>
        EftDev01
    </WMIProviderLocation>
    <WMIProvider>
        Processor
    </WMIProvider>
    <WMIProperty>
        ProcessorTime
    </WMIProperty>
    <Instance>
        <Element> Total </Element>
        <Element> 0 </Element>
        <Element> 2 </Element>
    </Instance>
    <Recurrence>
        <Recurrent> 5 </Recurrent>
    </Recurrence>
    <Method> Get </Method>
    <Method> Set </Method>
</MetaData>
```

Based on such metadata request, the DCM 20 requests and receives from the agent 16 located on EftDev01 the value of the processor usage as obtained every five seconds for processors 0 and 2 and for the average value for all the processors on EftDev01.

Note that the metadata request from the DMM 22 to the DCM 20 may have any particular form to obtain any particular type of performance data without departing from the spirit and scope of the present invention. Moreover, and particularly usefully, the metadata request may be to collect data from multiple machines 12 in a coordinated and collated fashion. Accordingly, if it is suspected that an action performed by machine 12a is related to a problem arising on machine 12c, both machines 12a, 12c may be monitored in a coordinated fashion to determine whether the machine 12a action indeed results in the machine 12c problem.

Based on the metadata request, the DCM 20 appropriately contacts each relevant agent 16 over an appropriate connection therewith (step 403a), directs same to send the requested performance data to the DCM 20 (step 403b), and in fact collects such requested performance data (step 403c). The particular mechanisms employed by the DCM 20 to communicate with the agents 16 and to collect the performance data therefrom are known or should be apparent to the relevant public and therefore need not be described herein in any detail. Accordingly, any appropriate communication and collection techniques and protocols may be employed without departing from the spirit and scope of the present invention.

The performance data as collected by the DCM 20 based on the metadata request is sent to the DMM 22 (step 403d), and the DMM 22 upon receiving the sent performance data from the DCM 20 transforms the received data if necessary (step 405) and then stores the received and perhaps transformed data at the DSM 24 (step 407). As may be appreciated, the DSM 24 is designed to store the performance data along with the corresponding metadata for current and future usage, including the aforementioned monitoring, analyzing and evaluation. The structure for storing the performance data and corresponding metadata may be any appropriate structure without departing from the spirit and scope of the present invention, and at any rate likely varies based on the structure of the metadata request and of the performance data received in response thereto. For performance and reliability reasons, the DSM 24 may be implemented as a relational database that can be queried according to a SQL-type language.

In one embodiment of the present invention, if the metadata corresponding to performance data includes a rule requiring an appropriate action be taken in response to the detection of a condition, as detected from the performance data, the DMM 22 enforces the rule (step 409). In particular, the DMM 22 includes appropriate logic to interpret and enforce the rule, and as performance data is received, the DMM 22 reviews same to determine if the condition is met, and if so takes the action. Note that the DMM 22 may be able to determine whether a condition is met based on reviewing the received performance data alone, such as for example if the condition is an instantaneous condition such as processor utilization exceeding a certain amount. Alternatively, the DMM 22 may have to refer to performance data as stored in the DSM 24 to determine whether a condition is met, such as for example if the condition is a trend condition such as memory usage increasing beyond a certain amount per unit of time. In either instance, the DMM 22 preferably checks in an ongoing manner to see whether the condition is met such that the condition is detected and the action is taken in real- or near-real-time.

The UIM 26 is the portal by which a user may enter requests, commands, and other information into the system manager 18 and view data collected thereby. Thus, the UIM 26 is responsible for receiving requests from the user and forwarding same to the DMM 22, and also for formatting data from the DSM 24 and representing the data to the user. Accordingly, and as seen in FIG. 3, the UIM 26 may include or have access to an object model of the DMM 22 and an object model of the DSM 24 to assist the user in setting up the DMM 22 and in retrieving and analyzing data from the DSM 24. Further, the UIM may include or have access to an object model of the DCM 20 if it is necessary and/or useful for a user to be able to request and receive performance data directly therefrom. In addition, the UIM 26 may include representation logic for representing the DMM 22 and DSM 24 to the user based on the object models thereof, and for representing the retrieved and analyzed data to the user, such as in the form of a graph or statistics.

Note that the UIM 26 may include or have access to a library of tools available to the user, where the library includes pre-defined metadata requests and rules for the DMM 22, queries for data from the DSM 24, and data representation formats for the UIM 26. However, it is to be appreciated that inasmuch as the system 10 can vary widely, and that the library may not have appropriate pre-defined materials, the UIM 26 may also include or have access to tools to assist the user in creating such metadata requests and rules for the DMM 22, queries for data from the DSM 24, and data representation formats for the UIM 26.

Note too that in the case where the DSM 24 is implemented as a relational database, such database can be queried according to a SQL-type language by way of any appropriate database query tool. Such tool may be part of the UIM 26 or may be external to the UIM 26.

Although the structure for storing the performance data and corresponding metadata likely varies based on the structure of the metadata request and of the performance data received in response thereto, it is to be appreciated that proper organization of such information can dramatically influence the overall efficiency of the system manager 18 and by extension the usability thereof. Accordingly, and in one embodiment of the present invention, and turning now to FIG. 5, the structure of all the data is embodied as a grouping in six main areas:

Metadata description: Contains structured information about the data, as was set forth above;

Performance Data: The actual data returned from the agents 16;

Data Profile: A collection of relationships between the metadata used during a run and the corresponding performance data from the run;

Run Information: Data specific to a particular run, including start and stop data, owner, etc., and pointers to the data profile and stress profile for the particular run;

Stress Profile: A collection of data referring to stress conditions and specific loads against targeted computers; and Stress Data: Data returned by a stress application.

Note that the stress profile and stress data groupings are used when the system manager 18 is employed to test a system 10. In such a situation, the stress profile including the stress conditions and specific load refers to a set of simulation parameters that are applied to the system 10 during a test in an effort to reveal weaknesses and other potential issues in the system 10, and the stress data represents how the system reacted to the test. As should now be appreciated, in one embodiment of the present invention, the system manager 18 includes support for a stress tool (not shown) that simulates a real-world environment. Such a stress tool is known or should be apparent to the relevant public and therefore need not be described herein in any detail.

Figure 5:
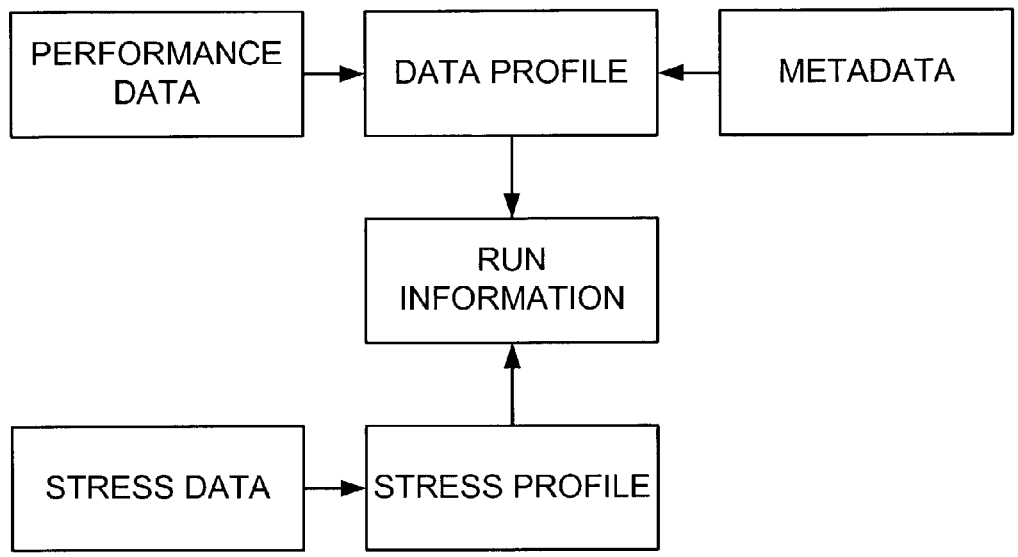
FIG. 5 is a block diagram showing a structure for organizing data as may be employed by the system manager of FIG. 3.
Figure 6:
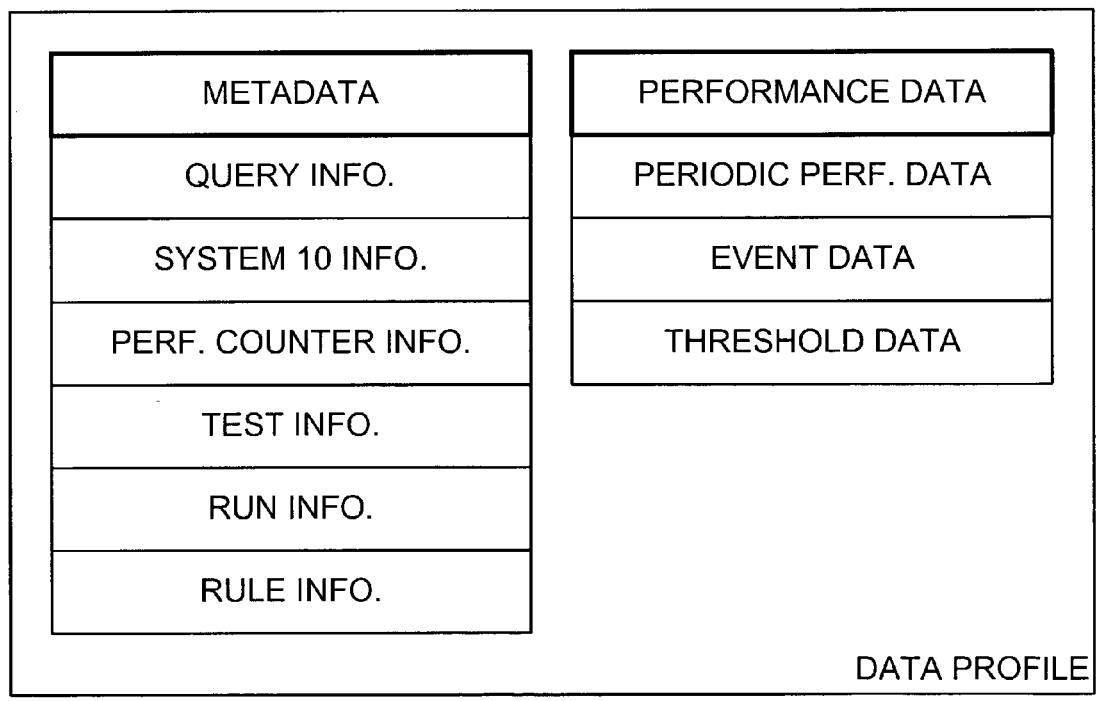
FIG. 6 is a block diagram showing a more detailed structure for organizing data as may be employed by the system manager of FIG. 3.

The metadata and performance data related by the data file as shown in FIG. 5 may be organized in the manner seen in FIG. 6. In particular, the metadata may be organized to include information on a request for data formulated as a query. Such query information includes particular performance counters as instantiated by corresponding agents 16 on machines 12, where each particular performance counters is to monitor an aspect of the corresponding machine 12, how each performance counter is to monitor (periodically measure a value, note when an event occurs, note when a particular value reaches a predefined threshold, etc.), and the like. Such metadata may also include information on the system 10, including each machine 12 therein, and information on each available performance counter from each machine 12 in the system 10.

Inasmuch as performance counters may monitor in at least three different ways, i.e., periodically, when an event occurs, and when a value exceeds a threshold), performance data as returned from the performance counters may correspondingly be stored as periodic performance data, event data, and threshold data, as seen in FIG. 6. For any of the three types of data, such data may be stored to include the time the data was collected, the performance monitor that collected the data, the value of the data, and the like.

In the instance where the system manager 18 is testing a system 10, such system manager 18 may apply several tests, where each test comprises multiple runs. Accordingly, and as seen in FIG. 6, the metadata may also include information on each run, including details of the run such as start and stop times and query information to be applied during the run, and information on each test, including each run to be applied during the test and how many times each run is to be applied.

In the instance where the system manager 18 is administering and monitoring a system 10, such system manager 18 may employ several pre-defined rules, as was described above. Accordingly, and as seen in FIG. 6, the metadata may also include information on each rule including a description of the condition that triggers the rule, where such condition is detected from received performance data, and the action to be taken in response to detection of the condition, where the action may be to issue a command to a particular machine 12, to notify a user, etc.

As was set forth above, the system manager 18 may be employed to test, administer and monitor, and diagnose problems with the distributed system 10 of machines 12.

Testing the system 10 is typically performed as the system 10 is being designed and constructed or as the system is being modified, and typically involves the aforementioned stress tool. In particular, the stress tool is set up to cause the system 10 to perform certain functions, and the system manager 18 is set up to monitor particular aspects of the machines 12 in the system 10, and also perhaps to implement certain test-based rules. Typically, the stress tool presses the system 10 by causing actions that might be of concern, and problems or potential problems in the system 10 are identified by the system manager 18 and dealt with as they arise. Notably, each test may comprise multiple identical runs to try to identify intermittent problems in the system 10, and multiple similar runs with slight variations to try to identify problems in the system 10 that might arise from the variations. Ideally, thorough testing should identify significant problems in the system 10 such that the significant problems may be dealt with and the system 10 may be put into operation.

Administering and monitoring the system 10 is typically performed as the system 10 is operational, and typically does not involve the aforementioned stress tool. Here, the system manager 18 is again set up to monitor particular aspects of the machines 12 in the system 10, but more likely to provide performance data that is applied to certain test-based rules that are implemented. For example, the rules applied by the system manager 18 may idle machines 12 in the system when demand is light and add machines 12 as additional capacity when demand increases. Similarly, if according to the rules a problem is detected, the system manager 18 may send an alert to a system administrator, perhaps in the form of an electronic mail message or an audio or visual warning. In addition, such performance data may be employed as baseline data in case a problem arises with the system 10. In the event of such problem, the baseline data may be employed as 'before' data to be compared with 'after' data relating to the problem.

Note that the performance data during and monitoring of the system 10 may also be employed to develop trend information, both short term and long term. For example, it may be noticed from the trend information that usage of the system 10 is low at night, and therefore capacity may be reduced. Accordingly, a rule may be implemented to effectuate such reduced capacity at night. Similarly, it may be noticed from the trend information that machines 12 fault significantly more prior to going bad, and therefore that a machine 12 should be replaced once excessive faulting is detected.

Diagnosing a problem with the system 10 is typically performed in a dynamic fashion by a user of the system manager 18 after the problem is identified. Notably, although a user may identify a problem with the system manager 18 either during testing or during monitoring and administering, it is to be appreciated that the problem may also be identified without the aid of the system manager 18. At any rate, once the problem is identified, a user typically formulates a strategy to diagnose the problem and implements the diagnosing strategy with the system manager. Of course, the strategy can vary widely depending on the factual circumstances of the identified problem, and can be based on performance data already collected, other objective data and information, and/or more instinctual as opposed to factual data, perhaps based on a user's knowledge and experience. Based on the strategy, the system manager 18 is set up to monitor particular aspects of the machines 12 in the system 10, and also perhaps to implement certain strategy-based rules. Hopefully, the strategy diagnoses the problem, although it may be necessary to reformulate or modify the strategy several times before the problem is diagnosed. Of course, once diagnosed, the problem is addressed and dealt with.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system manager 18 that simplifies and facilitates network management of a distributed computing system 10 including a group of computing machines 12. The system manager 18 facilitates testing and monitoring and administering of such computing system 10, and also diagnoses problems that arise during operation of such computing system 10, all by collecting, collating, and analyzing relevant performance data from machines 12 in the system 10. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A system manager for testing, administering and monitoring, and/or diagnosing problems with a distributed system having a plurality of computing machines, each machine including an event monitoring agent for monitoring for one or more pre-defined events occurring on the machine and/or for collecting usage statistics with respect to the machine, the system manager comprising a data collection module (DCM), a data management module (DMM), a data storing module (DSM), and a user interface module (UIM), the DCM for receiving a request from the DMM describing performance data to be collected from each of one or more of the machines of the system by way of the agent thereof, and based on the request for collecting such performance data from each agent and sending same to the DMM, the DMM for receiving the sent performance data from the DCM and storing the received performance data at the DSM along with metadata corresponding to the request for current and future usage, including monitoring, analyzing and evaluation, the UIM for receiving requests from a user and forwarding each received request to the DMM, and for formatting data from the DSM and representing the formatted data to the user, the DSM for storing performance data and corresponding metadata, the performance data comprising data as received from each agent in the system including raw values of a specific performance counter, the metadata comprising a description relating to circumstances of collecting the performance data, including data description information, data environment information, and a rule requiring performance of an action in response to a detection of a condition from performance data, the DMM for enforcing each rule by reviewing the performance data as received to determine if the condition thereof is met, and if so taking the corresponding action.

2. The system manager of claim 1 wherein the DCM receives a request from the DMM describing performance data to be collected from each of multiple ones of the machines of the system in a coordinated and collated fashion, whereby performance data from a first one of the machines may be compared against performance data from a second one of the machines.

3. The system manager of claim 1 wherein the DCM collects performance data from each agent by contacting each relevant agent based on the request, directing the contacted agent to send the requested performance data to the DCM, and collecting the requested performance data from the directed agent.

4. The system manager of claim 1 wherein the DMM transforms the received performance data as necessary prior to storing same at the DSM.

5. The system manager of claim 1 wherein the DSM is implemented as a relational database that can be queried.

6. The system manager of claim 1 wherein the condition is an instantaneous condition and the DMM determines whether the instantaneous condition is met based on reviewing the performance data as received.

7. The system manager of claim 1 wherein the condition is a trend condition and the DMM determines whether the trend condition is met based on reviewing the performance data as received and also the performance data as stored at the DSM.

8. The system manager of claim 1 wherein the DMM reviews the performance data in an ongoing manner to determine if the condition is met such that the condition is detected and the action is taken in real- or near-real-time.

9. The system manager of claim 1 wherein the UIM accesses an object model of the DMM to assist the user in setting up the same and an object model of the DSM to assist the user in retrieving and analyzing data from the DSM.

10. The system manager of claim 9 wherein the UIM accesses representation logic for representing the DMM and DSM to the user based on the object models thereof, and for representing the retrieved and analyzed data to the user.

11. The system manager of claim 9 wherein the UIM accesses a library available to the user, the library having pre-defined requests for the DMM, queries for data from the DSM, and data representation formats for the UIM.

12. The system manager of claim 9 wherein the UIM accesses a tool available to the user to assist in creating requests for the DMM, queries for data from the DSM, and data representation formats for the UIM.

13. A method for testing, administering and monitoring, and/or diagnosing problems with a distributed system having a plurality of computing machines, each machine including an event monitoring agent for monitoring for one or more pre-defined events occurring on the machine and/or for collecting usage statistics with respect to the machine, the method employing a system manager including a data collection module (DCM), a data management module (DMM), and a data storing module (DSM), the method comprising:

receiving, by the DCM, a request from the DMM describing performance data to be collected from each of one or more of the machines of the system by way of the agent thereof;

collecting, by the DCM and based on the request, such performance data from each agent;

sending, by the DCM, the collected performance data to the DMM;

receiving, by the DMM, the sent performance data from the DCM; and storing, by the DMM, the received performance data at the DSM along with metadata corresponding to the request for current and future usage, including monitoring, analyzing and evaluation, the DSM storing performance data and corresponding metadata, the performance data comprising data as received from each agent in the system including raw values of a specific performance counter, the metadata comprising a description relating to circumstances of collecting the performance data, including data description information, data environment information, and a rule requiring performance of an action in response to a detection of a condition from performance data, the DMM enforcing each rule by reviewing the performance data as received to determine if the condition thereof is met, and if so taking the corresponding action.

14. The method of claim 13 comprising the DCM receiving a request from the DMM describing performance data to be collected from each of multiple ones of the machines of the system in a coordinated and collated fashion, whereby performance data from a first one of the machines may be compared against performance data from a second one of the machines.

15. The method of claim 13 comprising the DCM collecting performance data from each agent by contacting each relevant agent based on the request, directing the contacted agent to send the requested performance data to the DCM, and collecting the requested performance data from the directed agent.

16. The method of claim 13 further comprising the DMM transforming the received performance data as necessary prior to storing same at the DSM.

17. The method of claim 13 comprising the DMM storing the received performance data and corresponding metadata in a relational database at the DSM.

18. The method of claim 13 wherein the condition is an instantaneous condition and comprising the DMM determining whether the instantaneous condition is met based on reviewing the performance data as received.

19. The method of claim 13 wherein the condition is a trend condition and comprising the DMM determining whether the trend condition is met based on reviewing the performance data as received and also the performance data as stored at the DSM.

20. The method of claim 13 comprising the DMM reviewing the performance data in an ongoing manner to determine if the condition is met such that the condition is detected and the action is taken in real- or near-real-time.

21. The method of claim 13 employing a system manager further including a user interface module (UIM) having access to an object model of the DMM and an object model of the DSM, the method further comprising employing the DMM object model by the UIM to set up the DMM and employing the DSM object model by the UIM to retrieve and analyze data from the DSM.

* * * * *